UNITED STATES PATENT OFFICE.

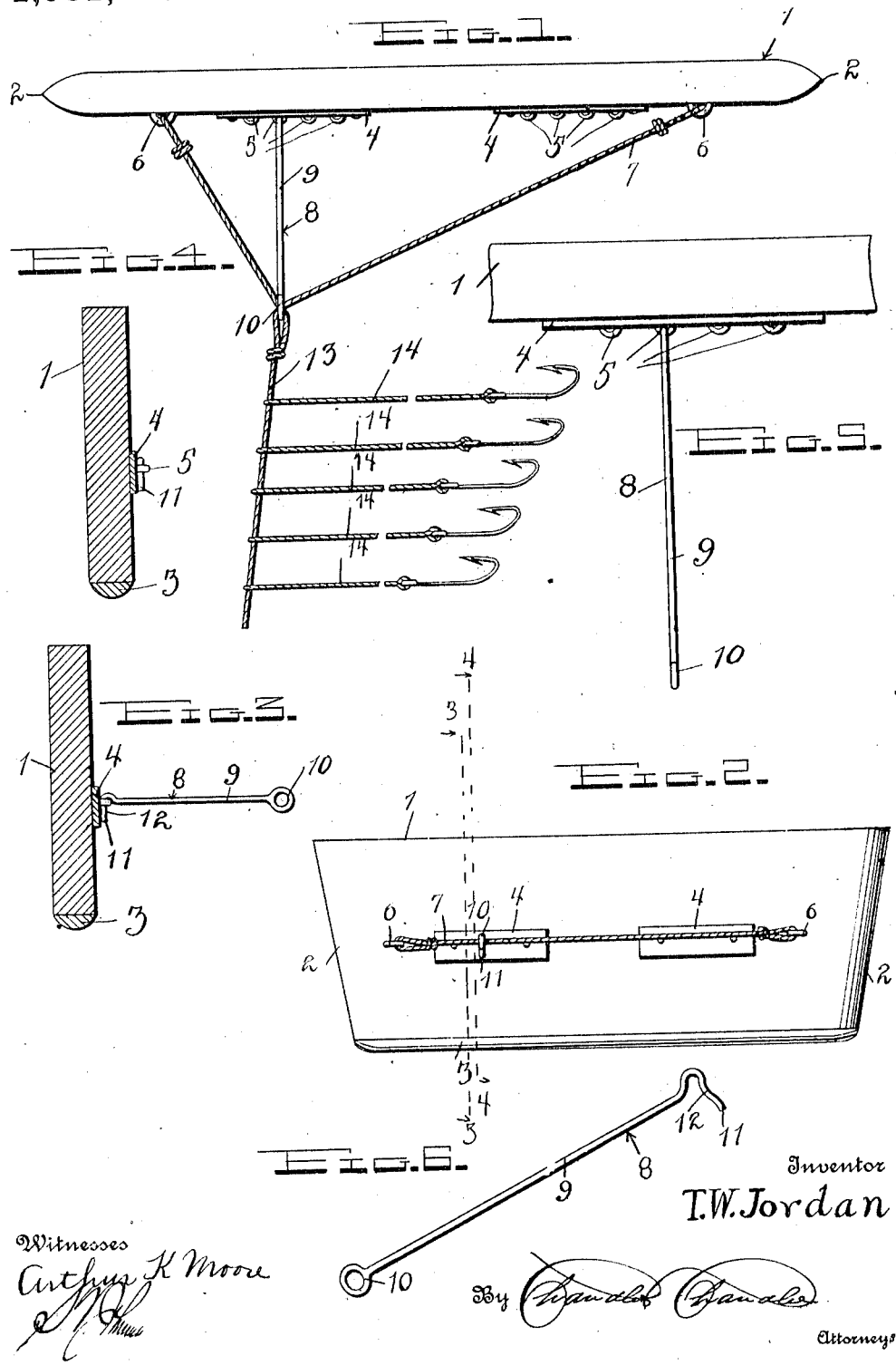

THEODORE WM. JORDAN, OF MILWAUKEE, WISCONSIN.

TROLLING DEVICE.

1,081,837. Specification of Letters Patent. Patented Dec. 16, 1913.

Application filed June 19, 1913. Serial No. 774,658.

*To all whom it may concern:*

Be it known that I, THEODORE WM. JORDAN, a citizen of the United States, residing at Milwaukee, in the county of Milwaukee, State of Wisconsin, have invented certain new and useful Improvements in Trolling Devices; and I do hereby declare the following to be a full, clear, and exact description of the invention, such as will enable others skilled in the art to which it appertains to make and use the same.

The present invention is directed to improvements in trolling devices, and has for its object to so construct a device of this character that the trolling lines will be supported in the water parallel with the boat, and not in the wake thereof, as is usual.

A further object of the invention is to provide a float for use in connection with trolling lines so constructed that the same can be adjusted for use on either side of the boat.

With these and other objects in view, this invention resides in the novel features of construction, formation, combination and arrangement of parts to be hereinafter more fully described, claimed and illustrated in the accompanying drawing, in which:—

Figure 1 is a top plan view of the float. Fig. 2 is a side elevation of the same. Fig. 3 is a sectional view on line 3—3 of Fig. 2. Fig. 4 is a similar view on line 4—4 of Fig. 2. Fig. 5 is an enlarged detail view of the hook in a position for removal. Fig. 6 is a detail perspective view of the hook.

Referring to the drawing, the numeral 1 designates the float, which is formed from wood, and has its ends 2 beveled, and its lower edge provided with a strip of lead 3, the weight of which being such that the float will travel in the water partially submerged. Secured to one face of the float 1, and arranged in spaced relation are plates 4, said plates being provided with a plurality of horizontally alined loops 5. Carried by the float 1, and adjacent the outer ends of the plates 4 are staples 6, and to which are secured the ends of the cord 7. The hook 8 has its shank 9 provided at its outer end with an eye 10, and its inner end with a bill 11, said bill being provided with a shoulder 12, which prevents the bill from becoming disengaged from the loops 5 when the shank 9 is disposed at right angles to the float, but permits ready disengagement of the bill when said shank is swung inwardly and against the float. One end of the main or draft line 13 is secured to the eye 10, and the other to the boat, (not shown). Trolling lines 14 are connected to the line 13, and in this instance there is shown four of such lines, but it is obvious that the number may be varied if desired. The cord 7 is passed through the eye 10 of the hook and is adapted to have its slack regulated by tying the same to the staples 6 under different tensions so that the hook 8 will be limited in its swinging movement so as to cause the float 1 to travel with the boat directly opposite, or in diagonal relation thereto, as desired.

It is obvious that by shifting the hook from loop to loop that the travel of the same can be readily regulated, and that when it is desired to shift the float from one side of the boat to the other it is only necessary to shift the hook from one plate to the other.

What is claimed is:—

1. A trolling device comprising a float, loops carried by the float, a hook having its bill detachably engaging said loops, said hook having an eye, a cord carried by the float for engaging said eye to hold the hook in different angular relations to the side of the float, as and for the purpose set forth.

2. A trolling device comprising a float, said float being adapted for travel partially submerged in the water, plates connected to the sides of the float, loops carried by the plates and arranged in horizontal alinement, a hook having a bill for detachably engaging the loops, an eye carried by one end of the hook, a cord having its ends tied to the float and passing through said eye, said cord serving to hold the hook in different angular relations to the side of the float, a draft line connecting the eye of the hook and having trolling lines connected thereto.

In testimony whereof, I affix my signature, in the presence of two witnesses.

THEODORE WM. JORDAN.

Witnesses:
EDWARD H. GERLACH,
PAUL JORDAN.